(12) United States Patent
Kono et al.

(10) Patent No.: US 7,978,286 B2
(45) Date of Patent: Jul. 12, 2011

(54) ILLUMINATION UNIT AND LIQUID CRYSTAL DISPLAY DEVICE

(75) Inventors: Makoto Kono, Ishikawa-gun (JP); Hiroshi Nagahama, Kanazawa (JP); Kenji Aoshima, Ishikawa-gun (JP); Jihei Kubo, Kanazawa (JP)

(73) Assignee: Toshiba Mobile Display Co., Ltd., Tokyo (JP)

( * ) Notice: Subject to any disclaimer, the term of this patent is extended or adjusted under 35 U.S.C. 154(b) by 211 days.

(21) Appl. No.: 12/489,545

(22) Filed: Jun. 23, 2009

(65) Prior Publication Data
US 2009/0316064 A1 Dec. 24, 2009

(30) Foreign Application Priority Data

Jun. 24, 2008 (JP) ................................. 2008-164861
Jun. 25, 2008 (JP) ................................. 2008-166037

(51) Int. Cl.
*G02F 1/1335* (2006.01)

(52) U.S. Cl. ............... 349/64; 349/56; 349/61; 349/62; 349/65; 349/67

(58) Field of Classification Search .............. 349/56, 349/61, 62, 64, 65, 67, 68
See application file for complete search history.

(56) References Cited

U.S. PATENT DOCUMENTS 7,588,360 B2 * 9/2009 Huang et al. ................. 362/555
7,589,356 B2 * 9/2009 Yoneda et al. ................. 257/99
2007/0058357 A1 * 3/2007 Yamaguchi et al. ............ 362/84

FOREIGN PATENT DOCUMENTS

| CN | 1630794 A | 6/2005 |
| CN | 101194205 A | 6/2008 |
| JP | 2003-76287 | 3/2003 |

OTHER PUBLICATIONS

Official communication from Chinese Patent Office, dated Aug. 27, 2010, issued in counterpart CN Application No. 200910139831.6 (6 pages).

* cited by examiner

*Primary Examiner* — Jennifer Doan
(74) *Attorney, Agent, or Firm* — Finnegan, Henderson, Farabow, Garrett & Dunner, L.L.P.

(57) ABSTRACT

An illumination unit includes a light guide having an incidence surface, a frame which is spaced apart from the incidence surface of the light guide, an accommodation section which is formed between the incidence surface of the light guide and the frame, and a light source unit including light-emitting diodes, a film substrate on which the light-emitting diodes are amounted, a heat radiation member having a support portion which supports the film substrate and a reflection portion which extends from the support portion, and an adhesive tape which adheres the film substrate to the support portion and has heat radiation properties, the light source unit being accommodated in the accommodation section.

12 Claims, 12 Drawing Sheets

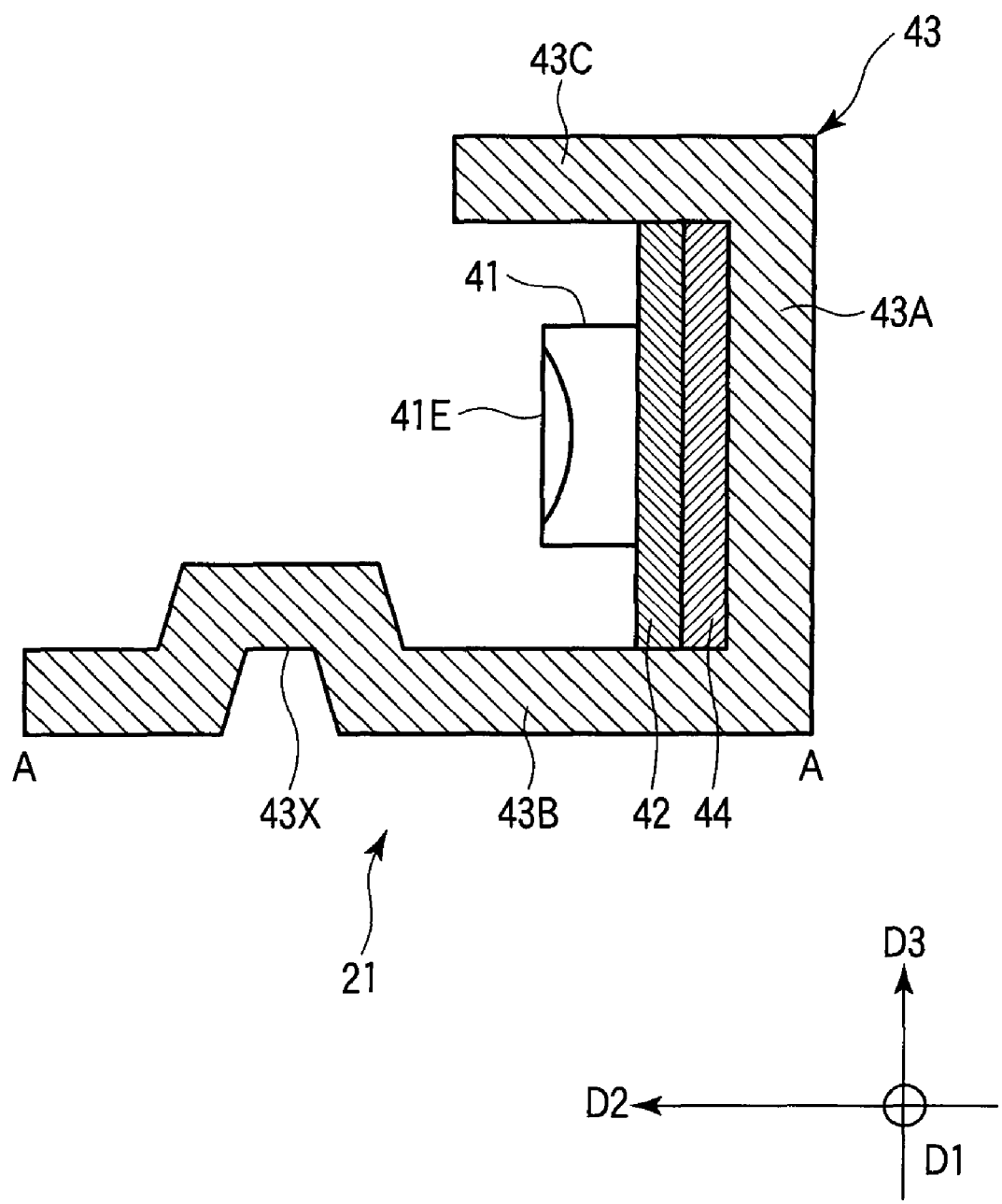
F I G. 11

ILLUMINATION UNIT AND LIQUID CRYSTAL DISPLAY DEVICE

CROSS-REFERENCE TO RELATED APPLICATIONS

This application is based upon and claims the benefit of priority from prior Japanese Patent Applications No. 2008-164861, filed Jun. 24, 2008; and No. 2008-166037, filed Jun. 25, 2008, the entire contents of both of which are incorporated herein by reference.

BACKGROUND OF THE INVENTION

1. Field of the Invention

The present invention relates to an illumination unit and a liquid crystal display device including the illumination unit.

2. Description of the Related Art

Liquid crystal display devices have been used in various fields as display devices of OA equipment, such as personal computers, and TV receivers, taking advantage of their features of light weight, small thickness and low power consumption. In recent years, the liquid crystal display devices have also been used as display devices of portable terminal devices such as mobile phones, car navigation devices, and game machines.

As such liquid crystal display devices, a reflective module which displays an image by selectively reflecting ambient light, a transmissive module which displays an image by selectively transmitting backlight, and a transflective module having both functions of the reflective module and transmissive module, have been developed.

The transmissive liquid crystal display device is configured to include a transmissive liquid crystal display panel and an illumination unit (i.e. a backlight) which is disposed on the back side of the liquid crystal display panel. In recent years, an illumination unit in which a light-emitting diode (LED) is applied as a light source has been put to practical use as the above-described illumination unit which is mounted in the liquid crystal display device.

Patent document 1 (Jpn. Pat. Appln. KOKAI Publication No. 2003-76287), for instance, discloses a backlight device in which a plurality of semiconductor light-emitting elements (LEDs, or light-emitting diodes), each having a light emission surface that is substantially perpendicular to a mounting surface thereof, are mounted in a string fashion on one surface of a film substrate. The backlight device is housed in a metal frame in the state in which the one surface of the film substrate is attached to a surface of a light guide such that the light emission surfaces of the semiconductor light-emitting elements are put in close contact with a light incidence surface of the light guide.

In particular, according to patent document 1, in order to escape heat occurring in the semiconductor light-emitting elements to the metal frame, a metal thin film for heat radiation is provided on almost the entirety of the other surface of the film substrate, on which the semiconductor light-emitting elements are not mounted, and the metal thin film is pressed by the metal frame. Further, according to patent document 1, so-called side-view-type LEDs are used as semiconductor light emission elements, and the film substrate is firmly adhered to a wide area of the light guide.

The light-emitting diode has such characteristics that the light-emitting diode produces heat in operation, and that the light-emitting diode tends to easily deteriorate in a high-temperature environment. Thus, in order to increase the lifetime of the light-emitting diode, there has been a demand for the enhancement of heat radiation efficiency, and for the driving in a low-temperature environment.

Moreover, there has been a demand for easy replacement of the light-emitting diode in case where the light-emitting diode has deteriorated. In the structure wherein the film substrate, on which the LEDs are mounted, is attached to the light guide, as disclosed in patent document 1, a work is needed to disassemble the backlight device and peel the film substrate from the light guide. The replacement work becomes more time-consuming as the film substrate is more firmly attached to the light guide.

BRIEF SUMMARY OF THE INVENTION

According to a first aspect of the present invention, there is provided an illumination unit comprising: a light guide having an incidence surface; a frame which holds the light guide and is spaced apart from the incidence surface of the light guide; an accommodation section which is formed between the incidence surface of the light guide and the frame; and a light source unit including a plurality of light-emitting diodes each having a light emission surface which is substantially parallel to a mounting surface thereof, a film substrate on which the plurality of light-emitting diodes are arranged in a first direction and are amounted, a heat radiation member having a support portion which supports the film substrate and a reflection portion which extends from the support portion in a second direction perpendicular to the first direction, and an adhesive tape which adheres the film substrate to the support portion and has heat radiation properties, the light source unit being accommodated in the accommodation section and being configured such that the light emission surface of each of the light-emitting diodes faces the incidence surface of the light guide in a state in which the light source unit is accommodated in the accommodation section.

According to a second aspect of the present invention, there is provided a liquid crystal display device comprising: a liquid crystal display panel which is configured to hold a liquid crystal layer between a pair of substrates; and an illumination unit which is disposed on the liquid crystal display panel and illuminates the liquid crystal display panel, the illumination unit including a light guide having an incidence surface; a frame which holds the light guide and is spaced apart from the incidence surface of the light guide; an accommodation section which is formed between the incidence surface of the light guide and the frame; and a light source unit including a plurality of light-emitting diodes each having a light emission surface which is substantially parallel to a mounting surface thereof, a film substrate on which the plurality of light-emitting diodes are arranged in a first direction and are amounted, a heat radiation member having a support portion which supports the film substrate and a reflection portion which extends from the support portion in a second direction perpendicular to the first direction, and an adhesive tape which adheres the film substrate to the support portion and has heat radiation properties, the light source unit being accommodated in the accommodation section and being configured such that the light emission surface of each of the light-emitting diodes faces the incidence surface of the light guide in a state in which the light source unit is accommodated in the accommodation section.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 is a cross-sectional view, taken along line A-A in FIG. 10, showing the cross-sectional structure of the light source unit shown in FIG. 10;

DETAILED DESCRIPTION OF THE INVENTION

An illumination unit and a liquid crystal display device according to an embodiment of the present invention will now be described with reference to the accompanying drawings. In this embodiment, a description is given of a liquid crystal display device having a transmissive display function which displays an image by selectively transmitting backlight from a backlight unit that is an illumination unit.

Figure 1:
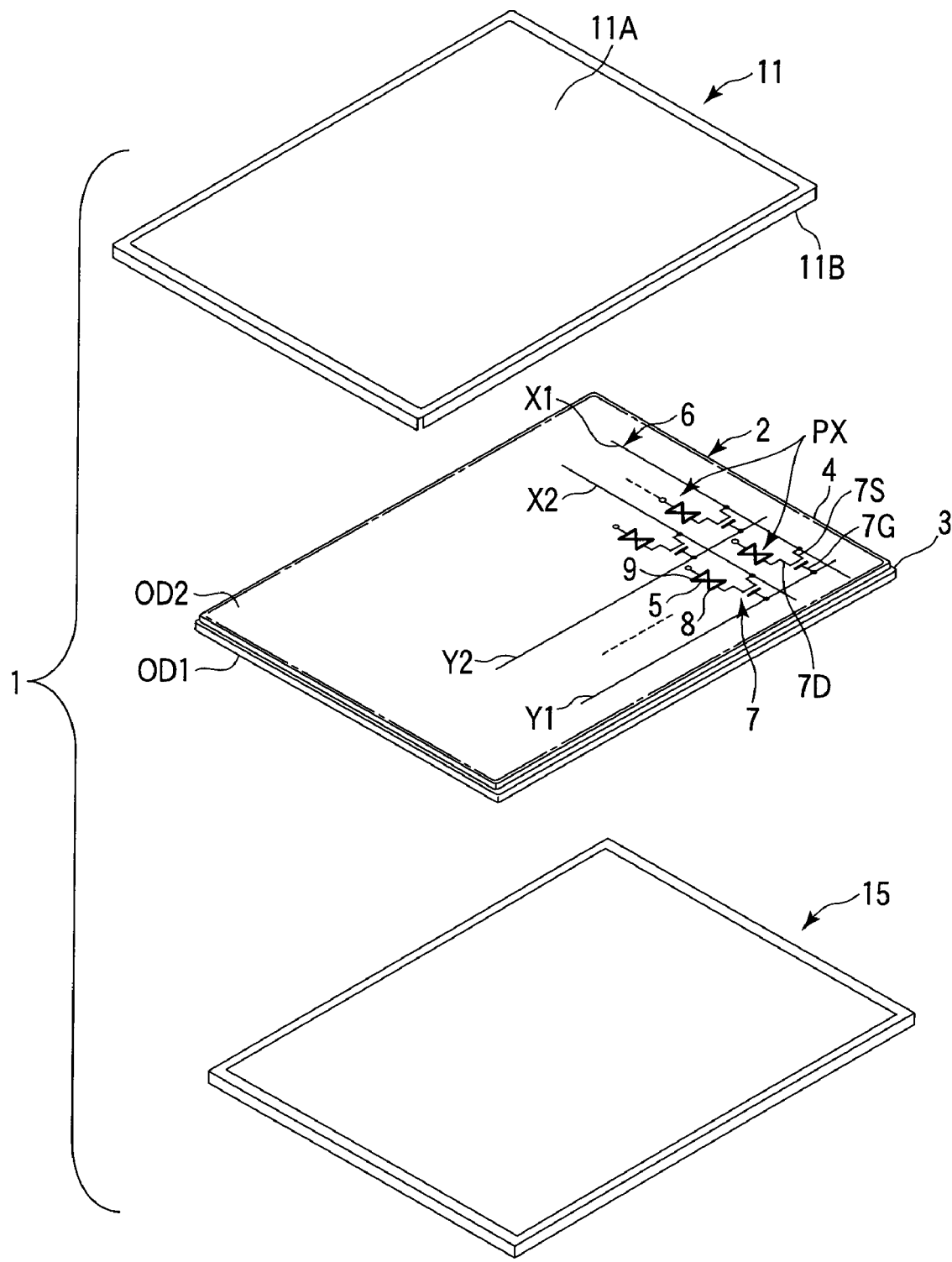
FIG. 1 is an exploded perspective view which schematically shows the structure of a liquid crystal display device according to an embodiment of the present invention.

Specifically, as is shown in FIG. 1, a liquid crystal display device 1 includes a substantially rectangular, planar transmissive liquid crystal display panel 2, and a backlight unit 15 which illuminates the liquid crystal display panel 2. The liquid crystal display panel 2 is configured such that a liquid crystal layer is held between a pair of substrates. Specifically, the liquid crystal display panel 2 includes a substantially rectangular array substrate 3, a substantially rectangular counter-substrate 4, and a liquid crystal layer 5 which is sealed between the array substrate 3 and counter-substrate 4. The array substrate 3 and counter-substrate 4 are attached via a sealant (not shown).

The liquid crystal display panel 2 includes, in an inside surrounded by the sealant, a substantially rectangular active area 6 that displays an image. The active area 6 is composed of a plurality of pixels PX that are arrayed in a matrix.

The array substrate 3 includes, in the active area 6, a plurality of scanning lines Y (1, 2, . . . ), a plurality of signal lines X (1, 2, . . . ), switching elements 7 which are disposed in association with the respective pixels PX, and pixel electrodes 8 which are connected to the switching elements 7 of the respective pixels PX. The pixel electrodes 8 are formed of a light-transmissive, electrically conductive material such as indium tin oxide (ITO) or indium zinc oxide (IZO).

The scanning lines Y extend along a row direction of the pixels PX. The signal lines X extend along a column direction of the pixels PX so as to cross the scanning lines Y via an insulation layer. Each of the switching elements 7 is disposed in a region including an intersection between the associated scanning line Y and signal line X.

The switching element 7 is composed of, e.g. a thin-film transistor (TFT) including a semiconductor layer which is formed of amorphous silicon or polysilicon. A gate electrode 7G of the switching element 7 is electrically connected to the associated scanning line Y (or the gate electrode 7G is formed integral with the scanning line Y). A source electrode 7S of the switching element 7 is electrically connected to the associated signal line X (or the source electrode 7S is formed integral with the signal line X). A drain electrode 7D of the switching element 7 is electrically connected to the pixel electrode 8 of the associated display pixel PX.

A common electrode 9 for applying a voltage to the liquid crystal layer 5 on the basis of a potential difference between the common electrode 9 and the pixel electrode 8 may be provided on the array substrate 3 or on the counter-substrate 4. Specifically, in a transverse electric field mode which mainly uses a transverse electric field (an electric field substantially parallel to the major surface of the array substrate 3), the array substrate 3 includes a common electrode 9 which is electrically insulated from the pixel electrode 8 and faces the pixel electrode 8. In a vertical electric field mode which mainly uses a vertical electric field (an electric field substantially vertical to the major surface of the array substrate 3), the counter-substrate 4 includes the common electrode 9 which is opposed to the pixel electrode 8 via the liquid crystal layer 5. The common electrode 9, like the pixel electrode 8, is formed of a light-transmissive electrically conductive material.

Those surfaces of the array substrate 3 and counter-substrate 4, which are in contact with the liquid crystal layer 5, are covered with alignment films. The array substrate 3 and counter-substrate 4 are attached to each other in such a state that their alignment films face via spacers (not shown) (e.g. columnar spacers which are formed integral with one of the substrates). In this case, a predetermined gap is formed between the array substrate 3 and counter-substrate 4. The liquid crystal layer 5 is formed of a liquid crystal composition that is sealed in the gap between the array substrate 3 and counter-substrate 4.

In the liquid crystal display panel 2, optical elements OD1 and OD2 are provided on the outer surface of the array substrate 3 and the outer surface of the counter-substrate 4. The optical elements OD1 and OD2 include polarizer plates whose directions of polarization are set in accordance with the characteristics of the liquid crystal layer 5. Besides, each of the optical elements OD1 and OD2 may include a retardation plate, where necessary.

In a color-display type liquid crystal display device, the liquid crystal display panel 2 includes, in the active area 6, a plurality of kinds of pixels, for instance, a red pixel that displays red (R), a green pixel that displays green (G), and a blue pixel that displays blue (B). Specifically, the red pixel has a red color filter that passes light with a principal wavelength of red. The green pixel has a green color filter that passes light with a principal wavelength of green. The blue pixel has a blue color filter that passes light with a principal wavelength of blue. These color filters are disposed on the major surface of the array substrate 3 or counter-substrate 4.

The liquid crystal display device 1 includes a bezel cover 11 having a rectangular frame-like shape. The bezel cover 11 includes a rectangular window portion 11A which exposes the active area 6 of the liquid crystal display panel 2, and a rectangular frame-shaped body portion 11B which defines the window portion 11A. The liquid crystal display panel 2 with the above-described structure is disposed between the backlight unit 15 and the bezel cover 11. In this case, the backlight unit 15 is disposed in the state in which the front surface thereof is opposed to the back surface of the liquid crystal display panel 2 (i.e. the array substrate side), and the backlight unit 15 illuminates the liquid crystal display panel 2 from the back side thereof.

Next, a first embodiment of the present invention is described.

Figure 2:
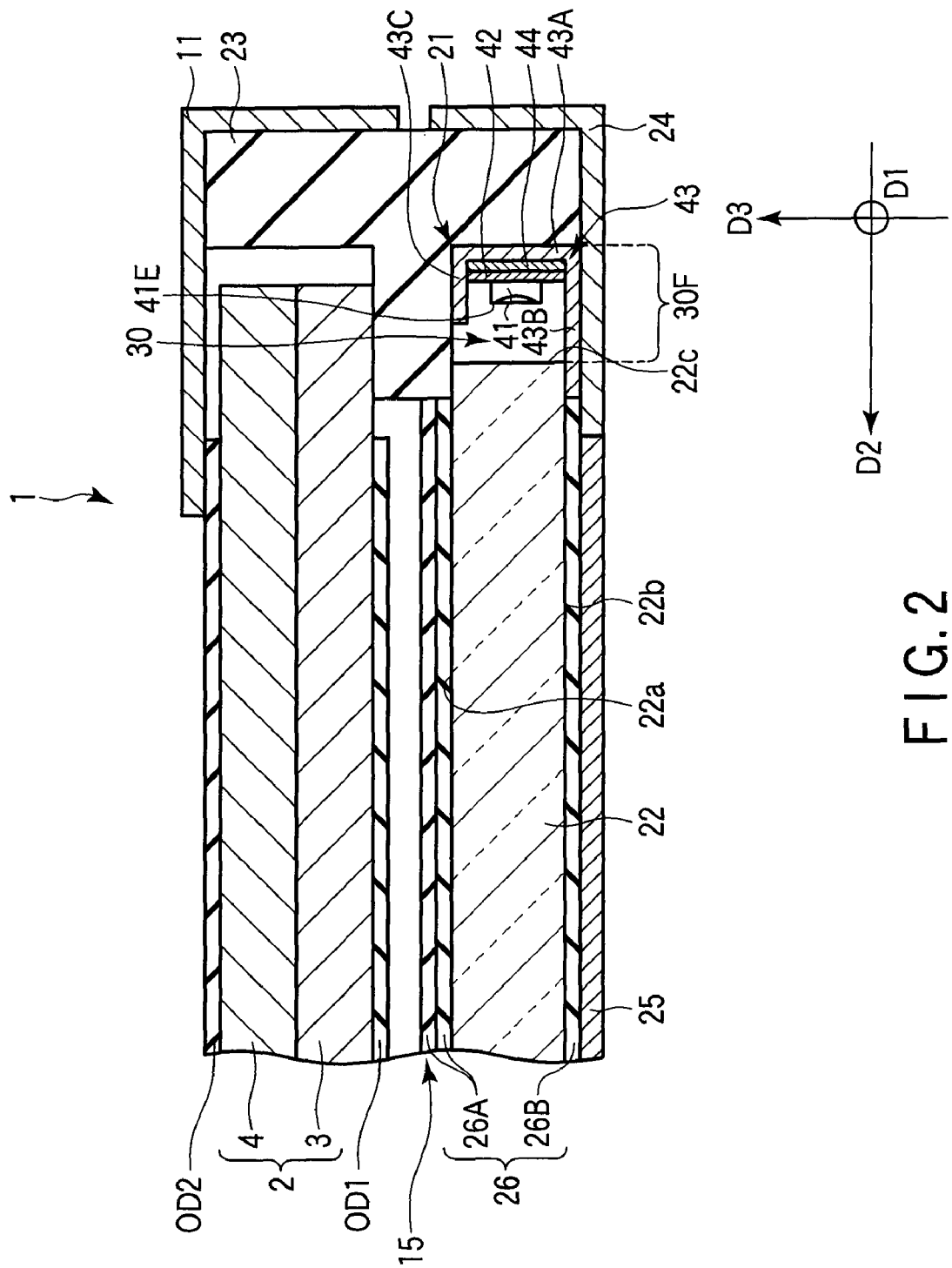
FIG. 2 is a cross-sectional view which schematically shows the structure including a light source unit of a backlight unit according to a first embodiment of the invention, which is applicable to the liquid crystal display device shown in FIG. 1.

As is shown in FIG. 2, the backlight unit 15 includes a light source unit 21, a light guide 22, a frame 23, a heat radiation plate 24, a back cover 25 and an optical sheet 26.

The light guide 22 has a function of guiding emission light from the light source unit 21 toward the liquid crystal display panel 2. The light guide 22 is formed of a light transmissive resin material such as an acrylic resin or a polycarbonate resin. The light guide 22 may be a wedge-shaped light guide which has a thin portion at one end and a thick portion at the other end which is opposed to the thin portion, or a planar light guide which has a substantially uniform thickness over the entirety thereof. In this embodiment, for instance, a rectangular planar light guide 22 is adopted.

The light guide 22 has a first major planar surface 22a with a rectangular shape which faces the liquid crystal display panel 2, a second major planar surface 22b with a rectangular shape which is opposed to the first major planar surface 22a, and four rectangular end surfaces which connect the first major planar surface 22a and the second major planar surface 22b. Of the four end surfaces, one end surface 22c, which is shown in FIG. 2, functions as an incidence surface which is opposed to the light source unit 21. In addition, the first major planar surface 22a functions as an emission surface which emits light toward the liquid crystal display panel 2.

The frame 23 is configured to mainly hold the light guide 22. In addition, the frame 23 is configured to also hold the liquid crystal display panel 2. The frame 23 is formed of a resin material. The bezel cover 11 is fixed to the frame 23 by means of, for example, calking or screwing, in the state in which the liquid crystal display panel 2 is clamped between the bezel cover 11 and the frame 23. At this time, the array substrate 3 of the liquid crystal display panel 2 is mounted on the frame 23 such that the optical element OD1 is opposed to the light guide 22, and the counter-substrate 4 is disposed such that the optical element OD2 is opposed to the bezel cover 11.

The frame 23 is spaced apart from the end surface 22c of the light guide 22. An accommodation section 30, which can accommodate the light source unit 21, is formed between the end surface 22c of the light guide 22 and the frame 23. Specifically, the end surface 22c and frame 23 extend in a direction normal to the sheet surface of FIG. 2, that is, in a first direction D1. In addition, the end surface 22c and frame 23 are spaced apart in a second direction D2 which is perpendicular to the first direction D1. As shown in FIG. 2, the accommodation section 30 is a space whose three faces are closed by the end surface 22 and frame 23, and another face thereof is provided with an opening portion 30F. The accommodation section 30 extends in the first direction D1 which is parallel to the direction of extension of the light source unit 21. Similarly, the opening portion 30F extends in the first direction D1.

A heat radiation plate 24 covers the opening portion 30F of the accommodation section 30 which is formed between the end surface 22c of the light guide 22 and the frame 23. Thereby, the accommodation section 30 has a substantially rectangular cross section which is surrounded by the heat radiation plate 24, the end surface 22c and the frame 23, and is formed in a tubular shape extending in the first direction D1. The heat radiation plate 24 is formed of a material with heat radiation properties, such as stainless steel (SUS) or aluminum (Al). For example, the heat radiation plate 24 is fixed to the frame 23, for example, by means of calking or screwing.

A back cover 25 is formed substantially in a box shape, and the back cover 25 can accommodate, for instance, the light guide 22, together with the frame 23.

The optical sheet 26 includes an optical sheet 26A which is disposed between the liquid crystal display panel 2 and the first major planar surface 22a of the light guide 22, and an optical sheet 26B which is disposed between the back cover 25 and the second major planar surface 22b of the light guide 22. The optical sheet 26A is, for instance, a light-collecting sheet, a light-diffusion sheet, or a sheet having a plurality of optical functions. The optical sheet 26A imparts predetermined optical characteristics to the light emerging from the light guide 22 and guides the light to the liquid crystal display panel 2. The optical sheet 26A is formed, for example, by stacking a plurality of sheets. The optical sheet 26B is a reflective sheet, and reflects light, which leaks from the second major planar surface 22b of the light guide 22, back to the light guide 22. These optical sheets 26 are formed in a substantially rectangular shape with a size that is substantially equal to the size of each of the first major planar surface 22a and second major planar surface 22b of the light guide 22.

The light source unit 21 is configured to have a shape extending in the first direction D1, and to include light-emitting diodes (LEDs) 41 which are point light sources, a film substrate 42, a heat radiation member 43 and an adhesive tape 44.

The light-emitting diode 41 is a semiconductor light-emitting element having a light emission surface 41E which is substantially parallel to a mounting surface thereof which is mounted on the film substrate 42. The light emission surface 41E of the light-emitting diode 41 faces the end surface 22c of the light guide 22.

Figure 3:
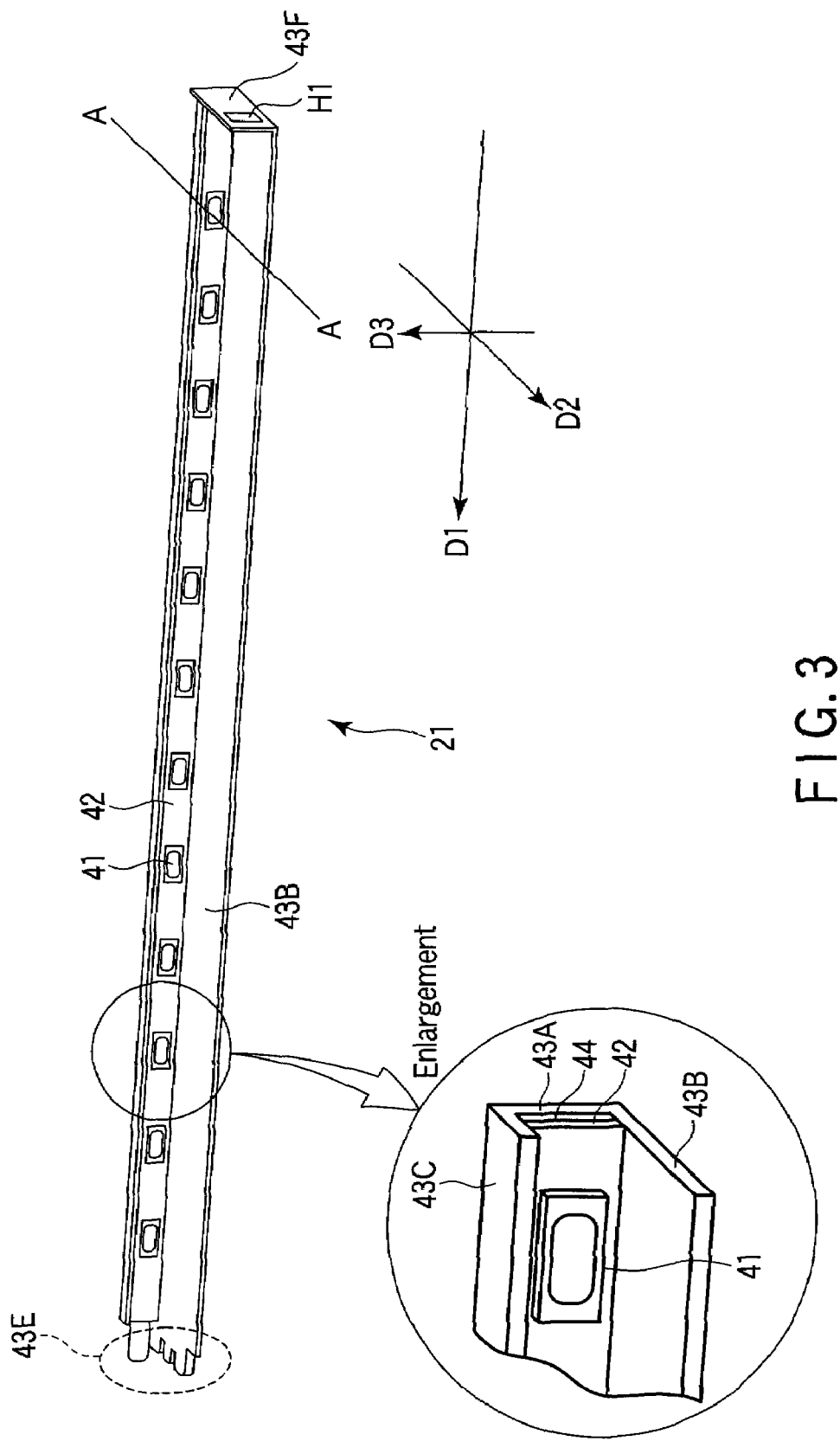
FIG. 3 is a perspective view which schematically shows the structure of the light source unit shown in FIG. 2.
Figure 4:
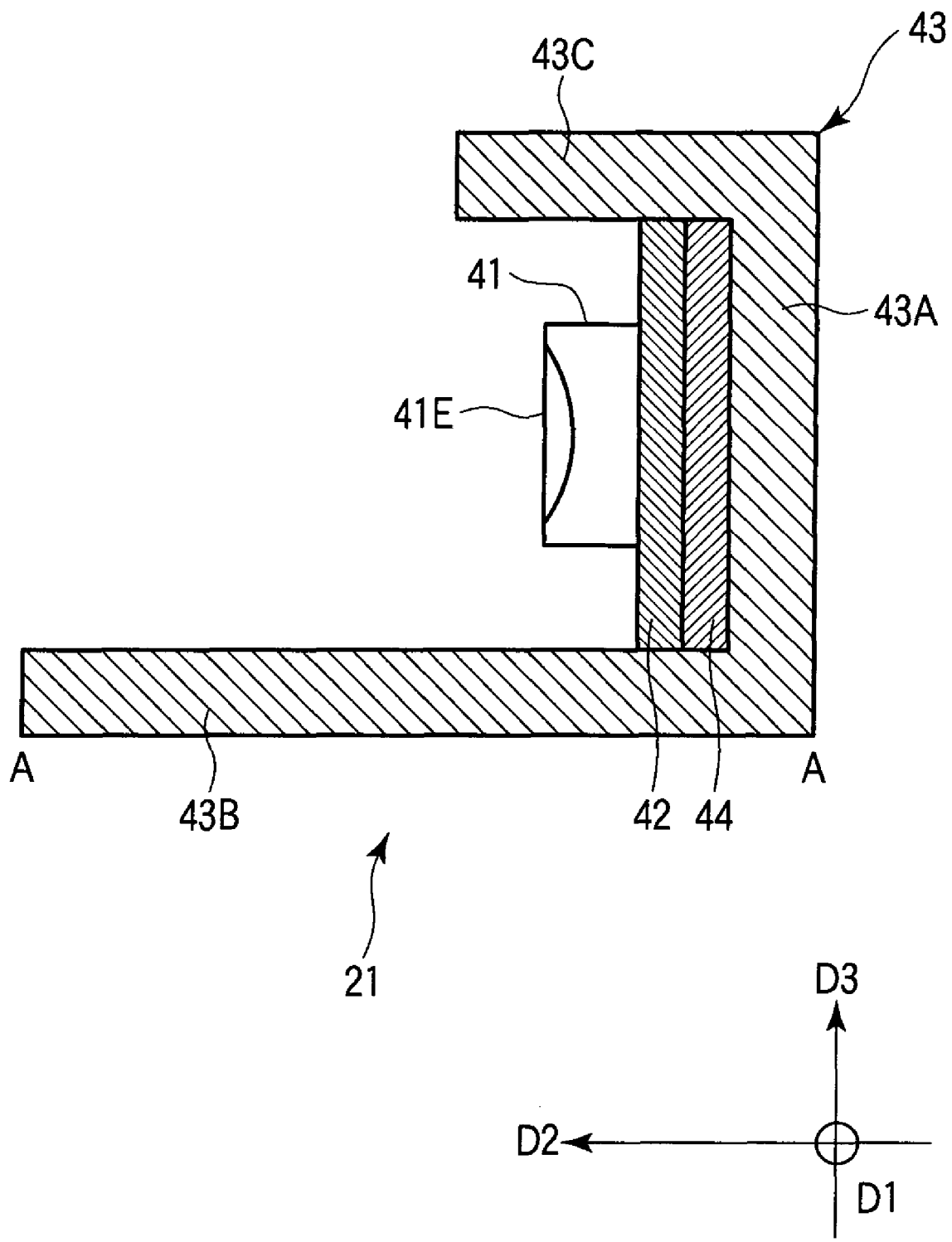
FIG. 4 is a cross-sectional view, taken along line A-A in FIG. 3, showing the cross-sectional structure of the light source unit shown in FIG. 3.

FIG. 3 and FIG. 4 show the light source unit 21 in greater detail.

The plural light-emitting diodes 41 are arranged in the first direction D1 and mounted on the film substrate 42. In the example shown in FIG. 3, the plural light-emitting diodes 41 are arranged in one row along the first direction D1, but they may be arranged in a plurality of rows. The film substrate 42 is formed in a strip shape extending in the first direction D1 (i.e. a substantially rectangular shape having long sides extending in the first direction D1).

The heat radiation member 43 extends in the first direction D1 and includes a support portion 43A which supports the film substrate 42, and a reflection portion 43B which extends from the support portion 43A in the second direction D2. The support portion 43A and reflection portion 43B are integrally formed so as to have a substantially L-shaped cross section.

Specifically, the support portion 43A has a substantially rectangular shape including long sides along the first direction D1, and short sides along a third direction D3 which is perpendicular to the first direction D1 and second direction D2. The length of the short side of the support portion 43A in the third direction D3 is equal to or greater than the width of the film substrate 42 (i.e. the length of the short side of the rectangle). The reflection portion 43B has a substantially rectangular shape including long sides along the first direction D1, and short sides along the second direction D2. One long side of the support portion 43A is connected to one long side of the reflection portion 43B.

In the example illustrated here, the heat radiation member 43 further includes a reflection portion 43C which is opposed to the reflection portion 43B. The reflection portion 43C has a substantially rectangular shape including long sides along the first direction D1, and short sides along the second direction D2. The reflection portion 43C is connected to the other long side of the support portion 43A. In short, the heat radiation member 43 is so formed as to have a substantially U-shaped cross section.

Furthermore, the heat radiation member 43 includes an insertion portion 43E on one end side thereof in the first direction D1. In addition, the heat radiation member 43 includes a hold portion 43F on the other end side thereof in the first direction D1. The hold portion 43F is formed in a plane which is substantially perpendicular to the support portion 43A, reflection portion 43B and reflection portion 43B. A screw hole H1, for example, is formed in the hold portion 43F.

The heat radiation member 43 is formed of a metallic material with heat radiation properties, such as stainless steel (SUS) or aluminum (Al). The reflection portions 43B and 43C are formed such that their surfaces surrounding the light-emitting diodes 41 have light reflectivity and reflect part of emission light from the light-emitting diodes 41.

The adhesive tape 44 adheres the film substrate 42, on which the plural light-emitting diodes 41 are mounted, to the support portion 43A. At this time, the light emission surface 41E of the light-emitting diode 41 faces in the second direction D2. The adhesive tape 44 is formed of a material with light radiation properties.

The above-described accommodation section 30 is configured such that the light source unit 21 with the above-described structure can be inserted/drawn out in/from the accommodation section 30 in the extension direction of the light source unit 21 (i.e. in the first direction D1). Specifically, the accommodation section 30 has such a guide as to enable the insertion/removal of the light source unit 21 in the extension direction D1. This guide is provided on at least one of the light guide 22, frame 23 and heat radiation plate 24, which constitute the accommodation section 30. For example, as shown in FIG. 2, since the outside shape in cross section of the heat radiation member 43 of the light source unit 21 is substantially identical to the inside shape in cross section of the accommodation section 30, the light source unit 21 can be inserted, while being guided, into the accommodation section 30. Besides, the accommodation section 30 has a recess portion in which the insertion portion 43E of the light source unit 21 is inserted. The recess portion, although not shown, is formed, for example, in the frame 23.

Figure 5:
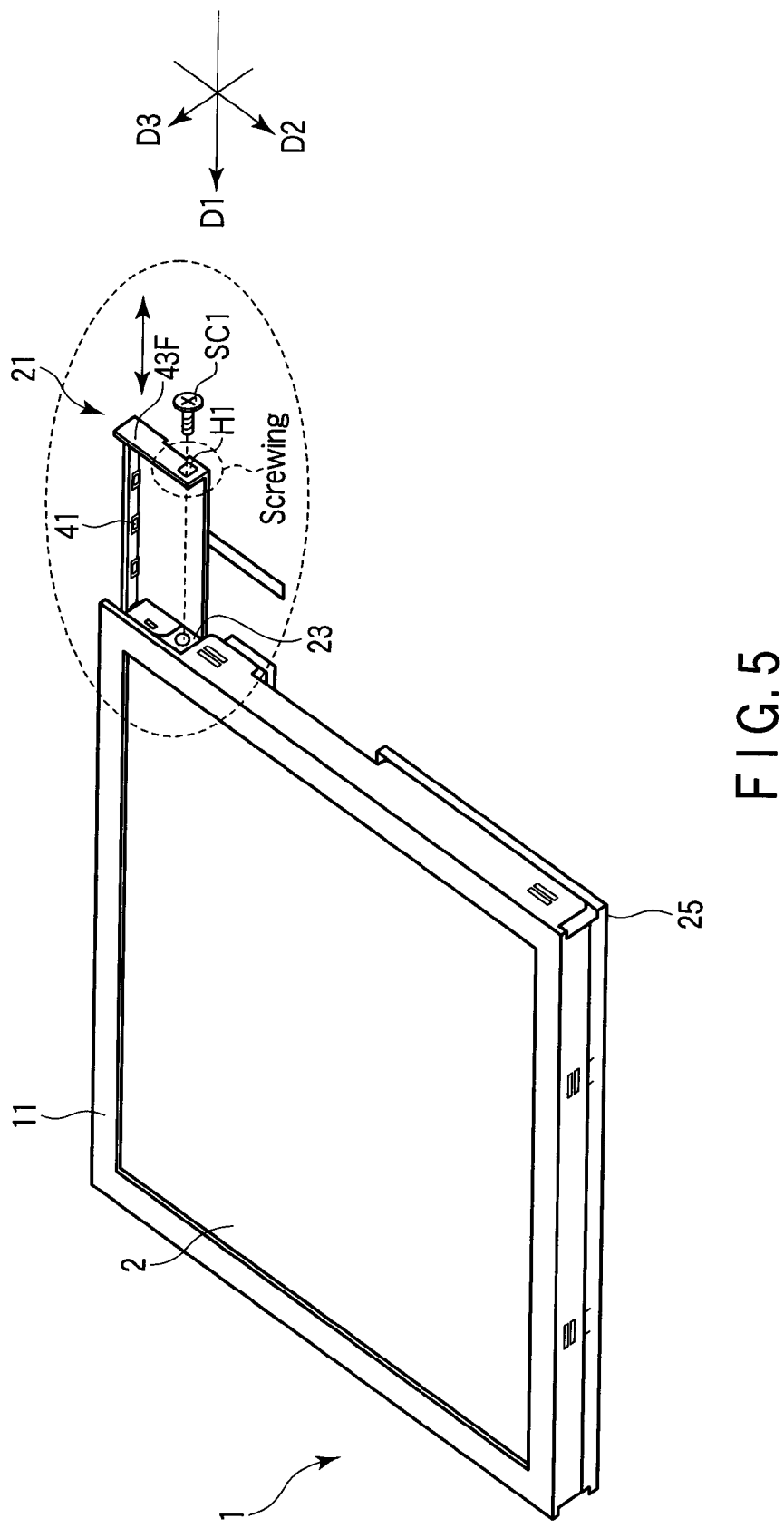
FIG. 5 is a view for describing the state in which the light source unit is drawn out/inserted from/in one side of the liquid crystal display device shown in FIG. 1.

As has been described above, the light source unit 21, which is inserted in the accommodation section 30, is set in a predetermined position by the guide and recess portion. In addition, in the state in which the light source unit 21 is inserted in the accommodation section 30, as shown in FIG. 5, the hold portion 43F of the heat radiation member 43 is screwed on the frame 23. Specifically, a screw SC1 is inserted from a screw hole H1 that is formed in the hold portion 43F, and is fixed to the frame 23. Thereby, the light source unit 21 is fixed to the frame 23 in the state in which the light source unit 21 is positioned in the accommodation section 30.

In this manner, in the state in which the light source unit 21 is inserted in the accommodation section 30, as shown in FIG. 2, the light emission surface 41E of the light-emitting diode 41 is opposed to the end surface 22c of the light guide 22, and the reflection portion 43B of the heat radiation member 43 is put in contact with the heat radiation plate 24. At this time, the support portion 43A and reflection portion 43C of the heat radiation member 43 are put in contact with the frame 23.

In this case, it is desirable that the light emission surface 41E of the light-emitting diode 41 be spaced apart from the end surface 22c of the light guide 22. Since the light-emitting diode 41 is a heat source, if the light-emitting diode 41 is put in contact with the light guide 22, such a problem may arise that the light guide 22 may be deformed due to the effect of the heat. In the first embodiment, since the light source unit 21 is positioned in the state in which the light source unit 21 is inserted in the accommodation section 30, there is no need to position the light source unit 21 by putting the light-emitting diode 41 and light guide 22 in contact.

According to the above-described structure, in the light source unit 21, the film substrate 42, on which the plural light-emitting diodes that are heat sources are mounted, is attached to the heat radiation member 43 by the adhesive tape 44 with heat radiation properties. Thus, the heat that is produced from the light-emitting diodes 41 can be escaped from the film substrate 42 to the heat radiation member 43 via the adhesive tape 44. In particular, since the film substrate 42 is attached to the support portion 43A without intervention of air, or the like, which functions as a heat insulator, the heat from the light-emitting diodes 41 can directly be escaped from the film substrate 42 to the heat radiation member 43, and the heat radiation efficiency can be enhanced.

In addition, in the state in which the light source unit 21 is inserted in the accommodation section 30, the heat radiation member 43 is in contact with the heat radiation plate 24. Thus, the heat that is produced from the light-emitting diodes 41 can further be escaped from the heat radiation member 43 of the light source unit 21 to the heat radiation plate 24. By the addition of the heat radiation plate 24 to the heat radiation path, compared to the case of using the heat radiation member 43 alone, the thermal capacity increases and the heat radiation efficiency can further be improved. Moreover, since the heat radiation plate 24 is exposed to the outside air, the heat radiation efficiency can further be enhanced.

Therefore, the light-emitting diodes 41 can be driven in a relatively low temperature environment, and the lifetime of the light-emitting diodes 41 can be increased.

Besides, in the case where replacement of the light source unit 21 becomes necessary, for example, due to degradation of the light-emitting diode 41, the light source unit 21, as shown in FIG. 5, can be drawn out from the accommodation unit 30 to the side of the liquid crystal display device 1 along the extension direction D1 of the light source unit 21 by holding the hold portion 43F of the heat radiation member 43 (sideward pull-out method). Thereby, the light source unit 21 can easily be replaced as a single unit.

Figure 6:
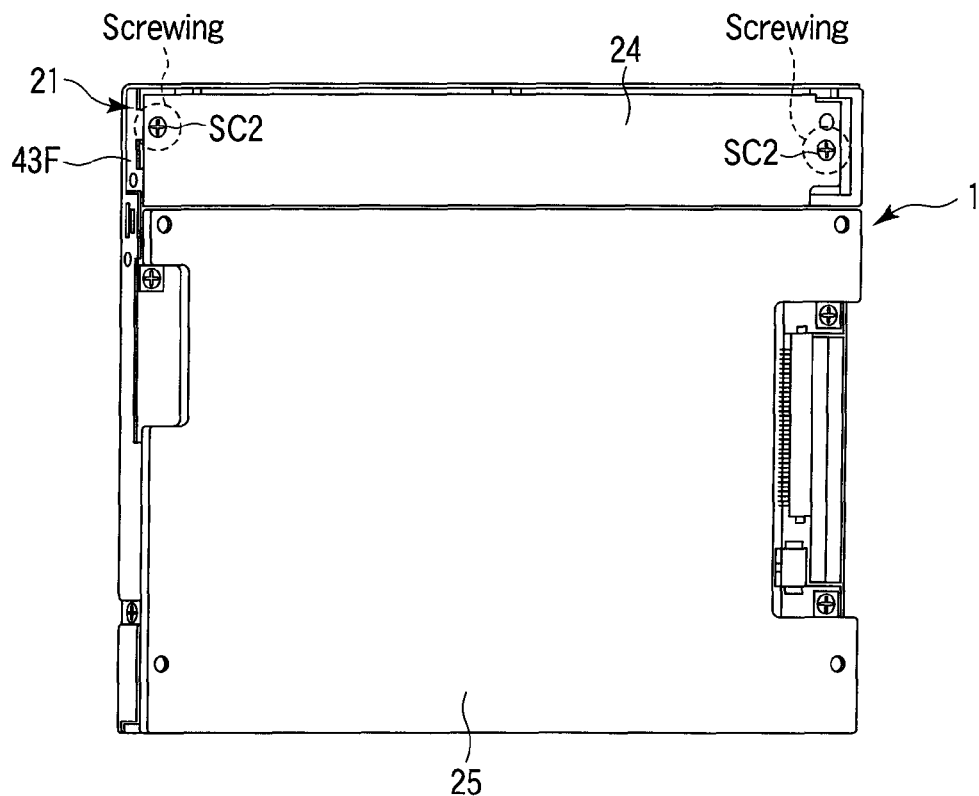
FIG. 6 schematically shows a back-side structure of the liquid crystal display device.

In the state in which the light source unit 21 is inserted in the accommodation section 30, it is desirable that the reflection portion 43B of the heat radiation member 43 and the heat radiation plate 24 be fixed by a screw SC2. For example, as shown in FIG. 6, the adhesion between the heat radiation member 43 and heat radiation plate 24 can be improved by the screwing from the back side of the liquid crystal display device 1 (screwing at two locations in the example of FIG. 6). Thereby, the heat radiation from the heat radiation member 43 to the heat radiation plate 24 can further be improved.

Figure 7:
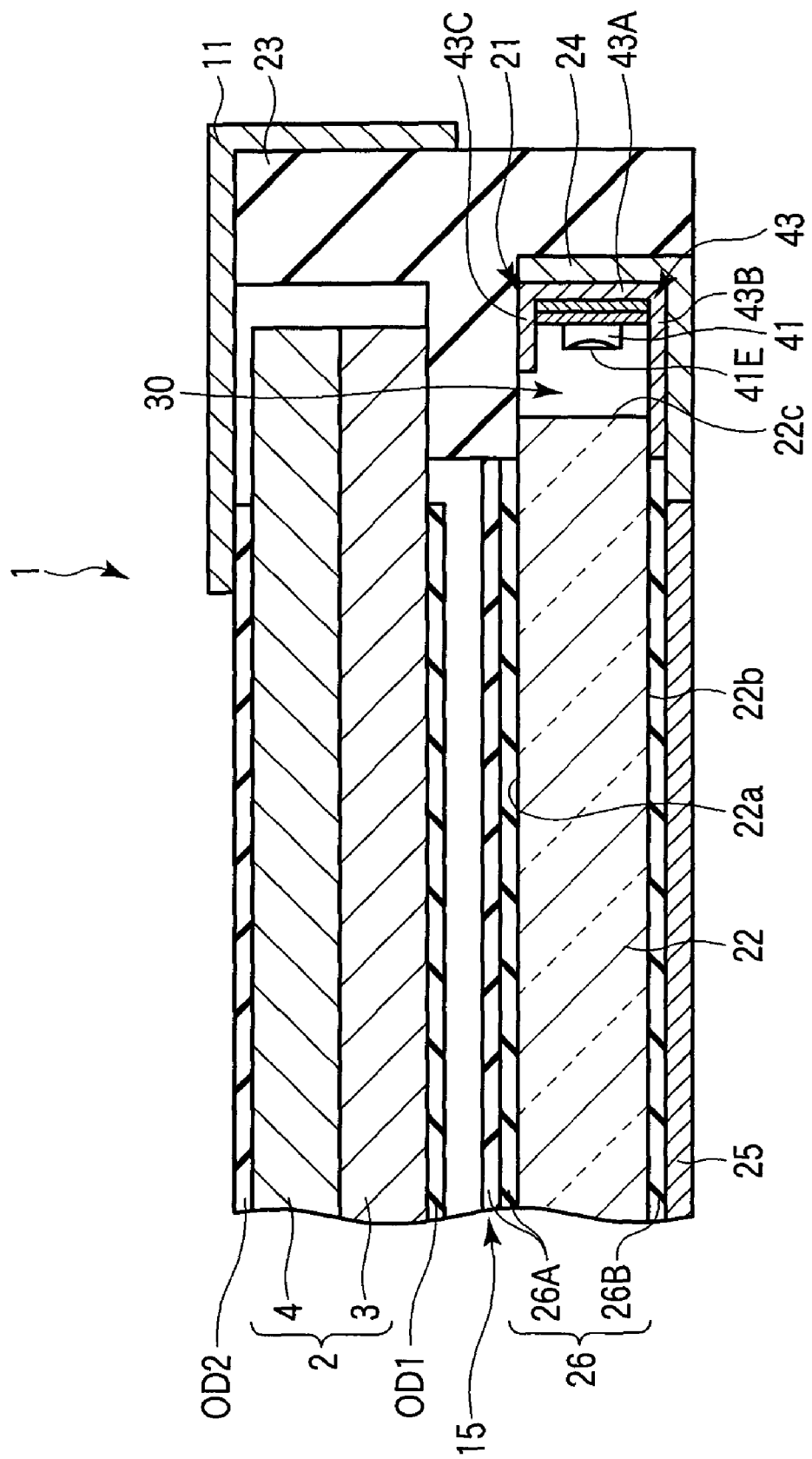
FIG. 7 is a cross-sectional view which schematically shows another structure including a light source unit of a backlight unit in the liquid crystal display device shown in FIG. 1.

Next, a modification of the first embodiment is described. In the example shown in FIG. 2, the heat radiation plate 24 is fixed on the outside of the frame 23 by means of, e.g. calking or screwing. In the modification, as shown in FIG. 7, unlike the example of FIG. 2, the radiation plate 24 is disposed inside the frame 23 and is put in contact with the support portion 43A of the heat radiation member 43. The radiation plate 24 is fixed by means of, e.g. calking or screwing. According to the modification with this structure, in the state in which the light source unit 21 is inserted in the accommodation section 30, the support portion 43A of the heat radiation plate 43, as well as the reflection portion 43B, is put in contact with the heat radiation plate 24. Thus, the heat radiation efficiency can further be improved, compared to the example of FIG. 2 in which the support portion 43A is in contact with the resin-made frame 23.

According to the above-described first embodiment, the light source unit 21 includes the plural light-emitting diodes 41 which are arranged in the first direction D1 and are mounted. The accommodation section 30, which is surrounded by the light guide 22, frame 23 and heat radiation plate 24, is configured such that the light source unit 21 can be inserted/drawn out along the first direction D1. By drawing out the light source unit 21 from the accommodation unit 30, the light source unit 21 can easily be replaced.

In addition, in the light source unit 21, the heat radiation properties of the heat that is produced from the light-emitting diodes 41 can be improved. Thereby, the light-emitting diodes 41 can be driven in a low temperature environment, and the lifetime of the light-emitting diodes 41 can be increased.

The width of the adhesive tape 44, which is applied in the first embodiment, should preferably be equal to or greater than the width of the film substrate 42 (i.e. the length in the third direction D3).

Figure 8:
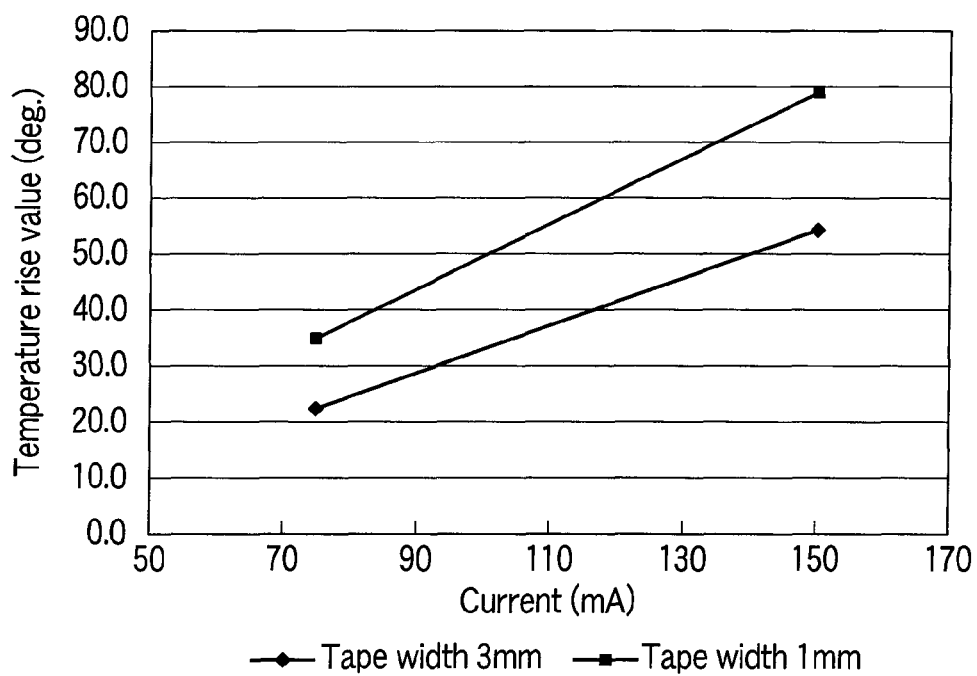
FIG. 8 is a graph showing a comparison result of temperature rise values of the light-emitting diode in connection with the width of an adhesive tape.

Temperature rise values of the light-emitting diodes 41 were compared between the case in which the width of the adhesive tape 44 is equal to the width of the film substrate 42 (3 mm) and the case in which the width of the adhesive tape 44 is less than the width of the film substrate 42 (1 mm). FIG. 8 shows a comparison result of temperature rise values at the respective tape widths.

In this case, the temperature rise value is defined as a difference between the temperature of the light-emitting diode 41 before driving, and the temperature of the light-emitting diode 41 after two hours, at which time an electric current with a predetermined amount has been supplied to the light-emitting diode 41 and the light-emitting diode 41 has been stabilized.

In the case where the width of the adhesive tape 44 is 1 mm, the temperature rise value is 34.9° C. when a current of 75 mA is supplied to the light-emitting diode 41, and the temperature rise value is 79.6° C. when a current of 150 mA is supplied to the light-emitting diode 41.

On the other hand, in the case where the width of the adhesive tape 44 is 3 mm, the temperature rise value is 22.8° C. when a current of 75 mA is supplied to the light-emitting diode 41, and the temperature rise value is 54.9° C. when a current of 150 mA is supplied to the light-emitting diode 41.

In the case where the width of the adhesive tape 44 is less than the width of the film substrate 42, the path of the heat escaping from the film substrate 42 to the heat radiation member 43 is reduced. In addition, at the part where the adhesive tape 44 is not present, an air layer is present between the film substrate 42 and the heat radiation member 43 and the air layer thermally insulates the film substrate 42 and the heat radiation member 43. Thus, a sufficient heat radiation effect cannot be obtained, and the temperature rise of the light-emitting diode 41 occurs.

It is thus desirable to use the adhesive tape 44 whose width is equal to or greater than the width of the film substrate 42. Thereby, the entire surface of the film substrate 42, which is opposite to the surface thereof on which the light-emitting diodes 41 are mounted, can be adhered to the heat radiation member 43. Therefore, a sufficient path of heat can be secured, without an air layer being present between the film substrate 42 and heat radiation member 43.

Next, a second embodiment of the present invention is described.

The second embodiment differs from the first embodiment in that the accommodation section 30 is configured such that the light source unit 21 is detachable from the opening portion 30F. The structural parts common to those in the first embodiment are denoted by like reference numerals, and a detailed description is omitted here.

Figure 9:
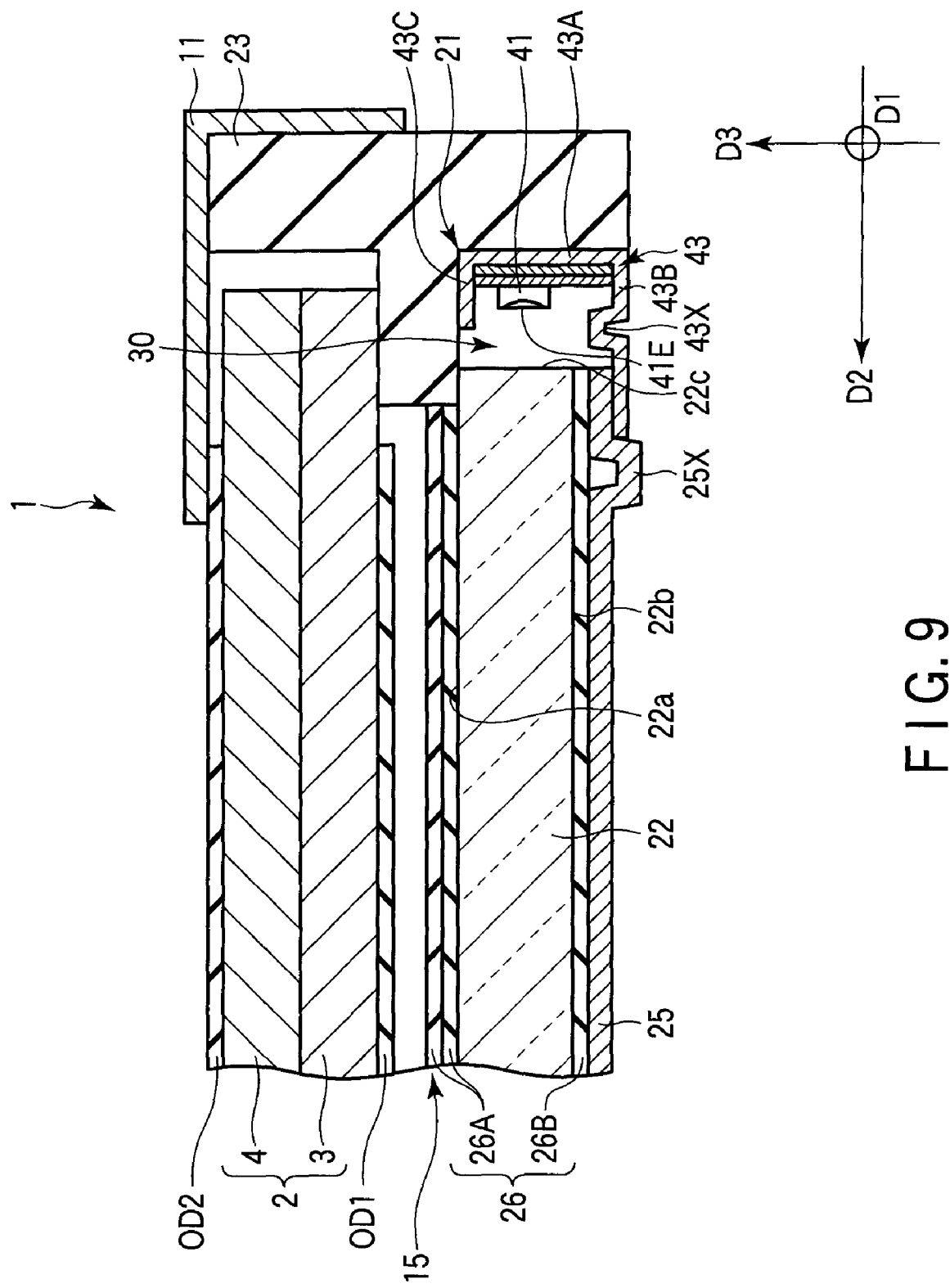
FIG. 9 is a cross-sectional view which schematically shows the structure including a light source unit of a backlight unit according to a second embodiment of the invention, which is applicable to the liquid crystal display device shown in FIG. 1.

Specifically, as shown in FIG. 9, the backlight unit 15 according to the second embodiment includes a light source unit 21, a light guide 22, a frame 23, a back cover 25 and an optical sheet 26.

The frame 23 is spaced apart from one end surface 22c of the light guide 22. An accommodation section 30 is formed between the frame 23 and the end surface 22c of the light guide 22. The accommodation section 30 is a space having a substantially U-shaped cross section between the end surface 22c of the light guide 22 and the frame 23, and the accommodation section 30 extends in the first direction D1.

The back cover 25 is formed substantially in a box shape, and the back cover 25 can accommodate, for instance, the light guide 22, together with the frame 23. The back cover 25 includes a projection portion 25X which projects to the back side of the backlight unit 15. The projection portion 25X extends in the first direction D1.

Figure 10:
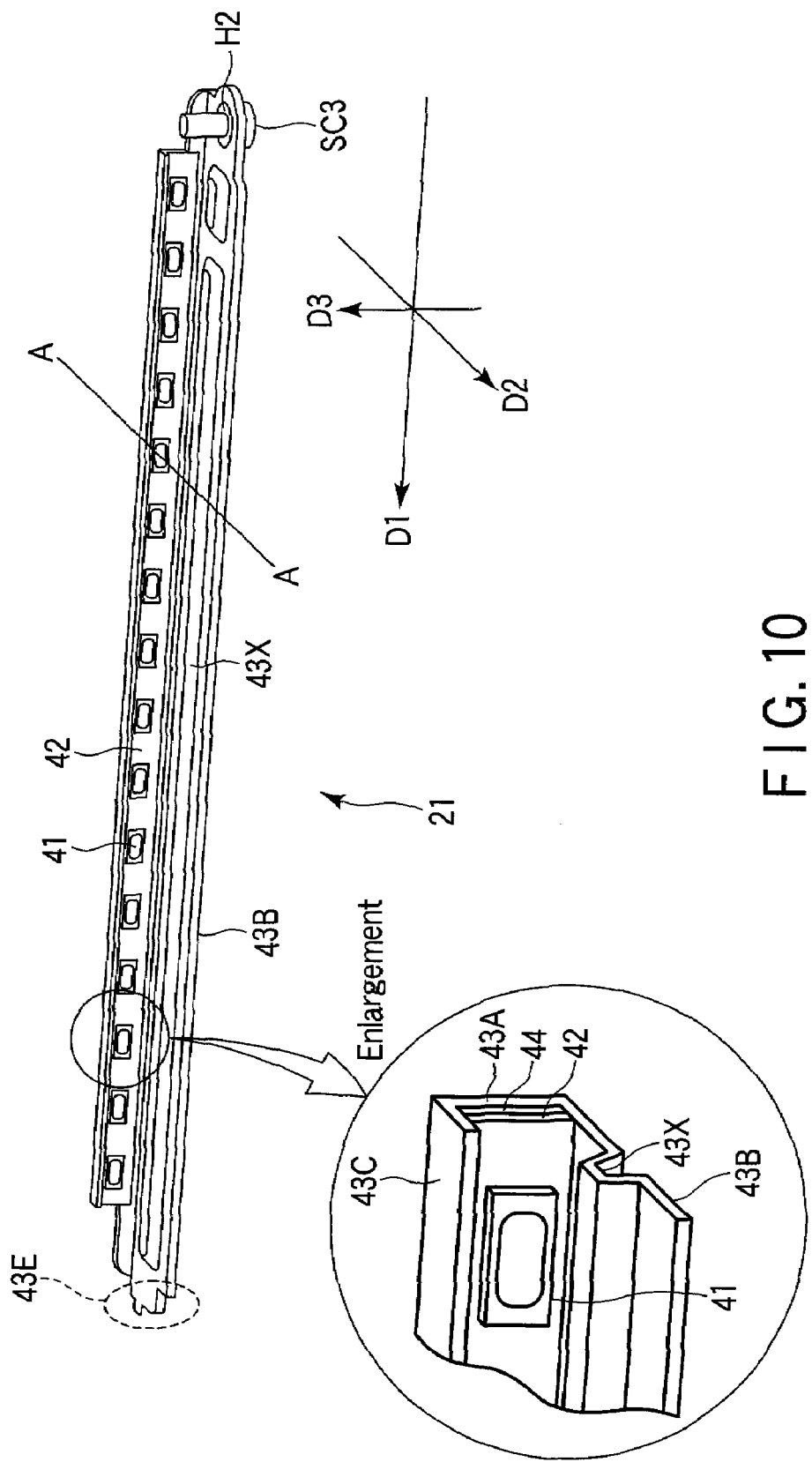
FIG. 10 is a perspective view which schematically shows the structure of the light source unit shown in FIG. 9.

As shown in FIG. 10 and FIG. 11, the light source unit 21 is configured to have a shape extending in the first direction D1, and to include light-emitting diodes 41, a film substrate 42, a heat radiation member 43 and an adhesive tape 44.

The heat radiation member 43 includes an insertion portion 43E on one end side thereof in the first direction D1. In the example shown in FIG. 10, the insertion portion 43E extends from the reflection portion 43B. A screw SC3 is attached on the other end side in the first direction D1 of the heat radiation member 43. In the example shown in FIG. 10, the screw SC3 is inserted in a screw hole H2 which is formed in an extension surface of the reflection portion 43B in the third direction D3 from the back side of the backlight unit 15.

In addition, the heat radiation member 43 includes a projection portion 43X which extends in the first direction D1 in the reflection portion 43B. The projection portion 43X projects from the back side of the backlight unit 15 toward the inside surrounding the light-emitting diodes 41, that is, toward the accommodation section 30. Thereby, the rigidity of the heat radiation member 43, and accordingly the rigidity of the light source unit 21, can be improved.

Figure 12:
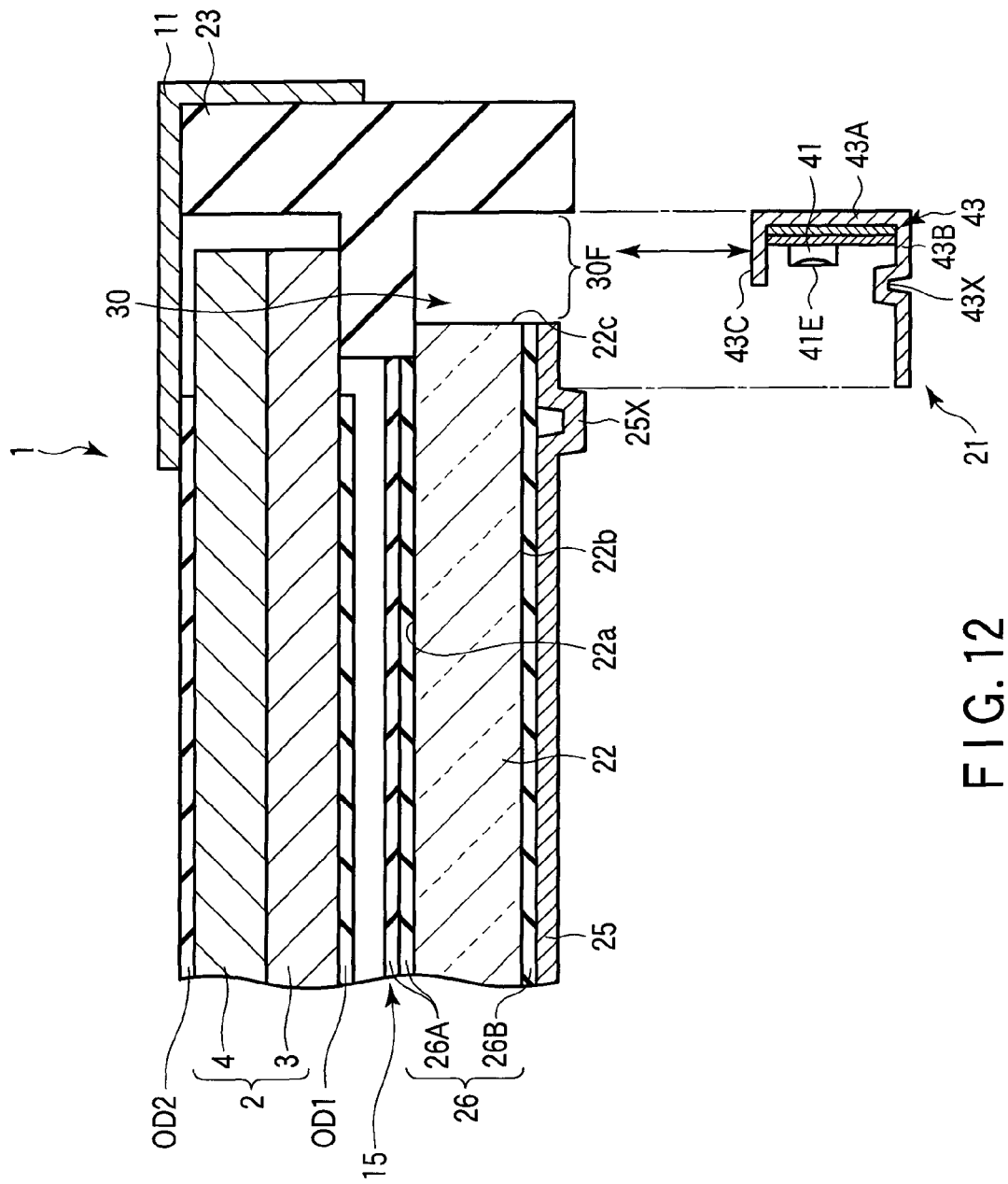
FIG. 12 is a cross-sectional view for describing the state in which the light source unit is drawn out/inserted from/in the back side of the liquid crystal display device shown in FIG. 1.
Figure 13:
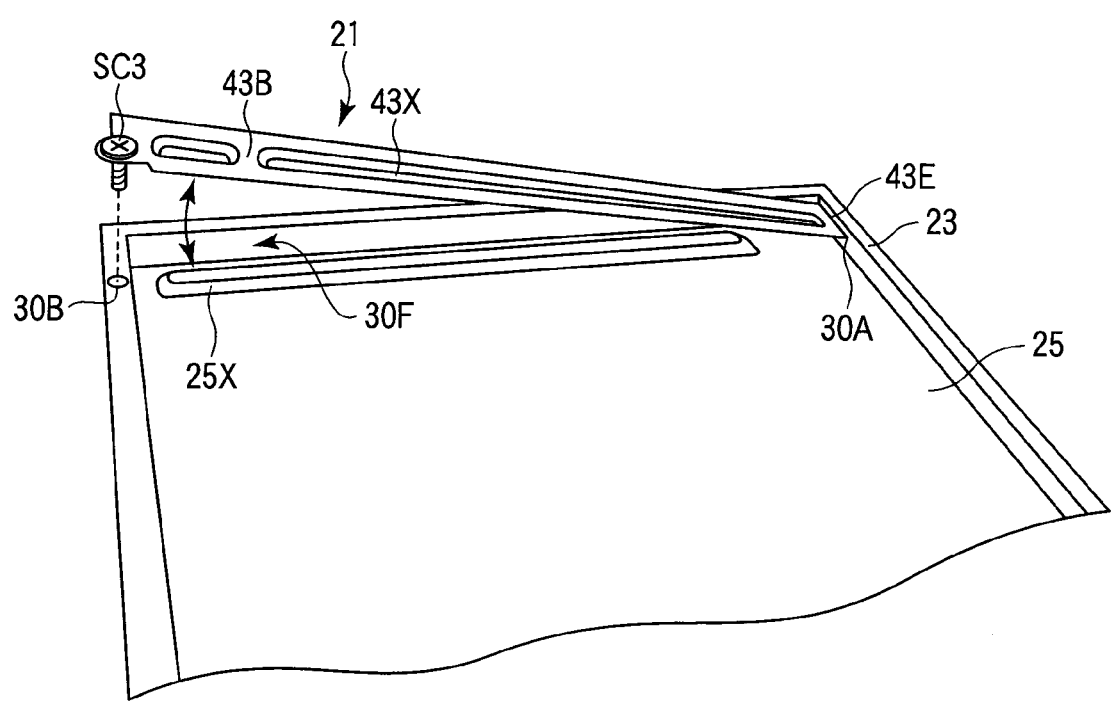
FIG. 13 is a cross-sectional view for describing the state in which the light source unit is drawn out/inserted from/in the back side of the liquid crystal display device.

The above-described accommodation section 30 can be configured such that the light-source unit 21 with the above-described structure is detachable from the accommodation section 30. Specifically, as shown in FIG. 12 and FIG. 13, the accommodation section 30, which is formed in a substantially U-shaped section between the end surface 22c of the light guide 22 and the frame 23, includes the opening portion 30F which is not surrounded by the end surface 22c of the light guide 22 and the frame 23. The opening portion 30F extends in the first direction D1. In addition, the frame 23, which constitutes the accommodation section 30, has a recess portion 30A in which the insertion portion 43E of the light source unit 21 is inserted. In addition, the frame 23 is provided with a screw hole 30B in which the screw SC3 that is inserted in the reflection portion 43B of the light source unit 21 is fastened.

The work of attaching the light source unit 21 to the accommodation section 30 is performed by the following procedure. Specifically, from the back side of the backlight unit 15, the insertion portion 43E of the light source unit 21 is inserted in the recess portion 30A of the frame 23. Then, the support portion 43A, etc. including the light-emitting diodes 41, are inserted from the opening portion 30F. At this time, the reflection portion 43B is disposed along the projection portion 25X of the back cover 25, and a part of the reflection portion 43B overlaps the back cover 25 (i.e. the back surface of the backlight unit 15). The opening portion 30F of the accommodation section 30 is covered with the reflection portion 43B that is disposed in this fashion. Further, the other end side of the light source unit 21 is screwed on the frame 23 by means of the screw SC3, and thus the light source unit 21 is fixed.

The work of detaching the light source unit 21 from the accommodation section 30 is performed by the procedure reverse to the above.

The light source unit 21, which is accommodated in the accommodation section 30, is set in a predetermined position, for example, by the engagement between the projection portion 25X of the back cover 25 and the reflection portion 43B, and the insertion of the insertion section 43E in the recess portion 30A. In addition, in the state in which the light source unit 21 is accommodated in the accommodation section 30, the screw SC3 is fastened to the frame 23. Thereby, the light source unit 21 is fixed to the frame 23 in the state in which the light source unit 21 is positioned in the accommodation section 30.

As has been described above, in the state in which the light source unit 21 is accommodated in the accommodation section 30, as shown in FIG. 9, the light emission surface 41E of the light-emitting diode 41 faces the end surface 22c of the light guide 22, and the reflection portion 43B of the heat radiation member 43 covers the accommodation section 30.

At this time, the support portion 43A and reflection portion 43C of the heat radiation member 43 are in contact with the frame 23, and position the light source unit 21.

In the meantime, in this case, like the first embodiment, it is desirable that the light emission surface 41E of the light-emitting diode 41 be spaced apart from the end surface 22c of the light guide 22.

According to the above-described structure, like the first embodiment, the heat radiation efficiency can be improved. Therefore, the light-emitting diodes 41 can be driven in a relatively low temperature environment, and the lifetime of the light-emitting diodes 41 can be increased.

In the state in which the light source unit 21 is accommodated in the accommodation section 30, the heat radiation member 43 is in contact with the back cover 25. The back cover 25 is formed of a metallic material with light radiation properties, and the heat that is produced from the light-emitting diodes 41 can further be escaped from the heat radiation member 43 of the light source unit 21 to the back cover 25. By the addition of the back cover 25 to the heat radiation path, compared to the case of using the heat radiation member 43 alone, the thermal capacity increases and the heat radiation efficiency can further be improved.

Moreover, in the state in which the light source unit 21 is accommodated in the accommodation section 30, the reflection portion 43B forms an armor of the backlight unit 15, and is exposed to the outside air. Similarly, the back cover 25 forms an armor of the backlight unit 15, and is exposed to the outside air. Therefore, the heat radiation efficiency can further be improved.

In addition, the reflection portion 43B, which constitutes the light source unit 21, includes the projection portion 43X which extends in the extension direction of the reflection portion 43B. Thereby, even if the heat radiation member 43 is formed of a relatively thin metallic plate material in order to realize reduction in weight, the rigidity of the light source unit 21 can be improved.

Thus, the occurrence of warpage along the extension direction of the light source unit 21 can be suppressed. In addition, deformation of the reflection portion 43B can be prevented, the adhesion of the reflection portion 43B to the back cover 25 can be enhanced, the heat transfer from the reflection portion 43B to the back cover 25 can be promoted, and light leakage from between the reflection portion 43B and the back cover 25 can be suppressed.

Furthermore, the surface area of the reflection portion 43B can be increased by the projection portion 43X. Since the reflection portion 43B forms the armor, the surface area which is exposed to the outside air increases, and the heat radiation efficiency can further be increased.

On the other hand, in the case where replacement of the light source unit 21 becomes necessary, for example, due to degradation of the light-emitting diode 41, the light source unit 21, as shown in FIG. 12 and FIG. 13, can be drawn out from the accommodation section 30 via the back surface of the liquid crystal display device 1 (i.e. the back surface of the light source unit 21) after removing the screw SC3 (back surface pull-out method). Thereby, the light source unit 21 can easily be replaced as a single unit.

According to the above-described second embodiment, the light source unit 21 includes the plural light-emitting diodes 41 which are arranged in the first direction D1 and are mounted. The light source unit 21 is accommodated in the accommodation section 30 which is formed by the end surface 22c of the light guide 22 and the frame 23. The accommodation section 30 is configured such that the light source unit 21 can be inserted/drawn out from the accommodation section 30. In the state in which the light source unit 21 is accommodated in the accommodation section 30, the reflection portion 43B of the heat radiation member 43 covers the accommodation section 30. Thus, by drawing out the light source unit 21 from the accommodation unit 30, the light source unit 21 can easily be replaced.

In addition, in the light source unit 21, the heat radiation properties of the heat that is produced from the light-emitting diodes 41 can be improved. Thereby, the light-emitting diodes 41 can be driven in a low temperature environment, and the lifetime of the light-emitting diodes 41 can be increased.

As regards the adhesive tape 44 that is applied in the second embodiment, like the first embodiment, the width of the adhesive tape 44 (i.e. the length in the third direction D3) should preferably be equal to or greater than the width of the film substrate 42.

As has been described above, the present embodiment can provide an illumination unit which includes a heat radiation structure that is capable of increasing the lifetime of light-emitting diodes, and which enables easy replacement of a light source unit including the light-emitting diodes, and a liquid crystal display device including the illumination unit.

The present invention is not limited directly to the above-described embodiments. In practice, the structural elements can be modified and embodied without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

The transmissive liquid crystal display panel, which has been described in each of the embodiments, may have any structure if at least a part of the active area has a transmissive display function of selectively transmitting illumination light from the backlight unit 15, and the transmissive liquid crystal display panel may include a transflective liquid crystal display panel in which each of pixels has a reflective part and a transmissive part.

What is claimed is:

1. An illumination unit comprising:
    a light guide having an incidence surface;
    a frame which holds the light guide and is spaced apart from the incidence surface of the light guide;
    an accommodation section which is formed between the incidence surface of the light guide and the frame; and
    a light source unit including a plurality of light-emitting diodes each having a light emission surface which is substantially parallel to a mounting surface thereof, a film substrate on which the plurality of light-emitting diodes are arranged in a first direction and are mounted, a heat radiation member having a support portion which supports the film substrate and a reflection portion which extends from the support portion in a second direction perpendicular to the first direction, and an adhesive tape which adheres the film substrate to the support portion and has heat radiation properties, the light source unit being accommodated in the accommodation section and being configured such that the light emission surface of each of the light-emitting diodes faces the incidence surface of the light guide in a state in which the light source unit is accommodated in the accommodation section.

2. The illumination unit according to claim 1, further comprising a heat radiation plate which covers an opening portion extending in the first direction of the accommodation section,
    wherein the accommodation section is formed in a tubular shape extending in the first direction, and is configured such that the light source unit is insertable/removable in the first direction, and
    the heat radiation plate is in contact with the reflection portion of the light source unit which is inserted in the accommodation section.

3. The illumination unit according to claim 2, wherein the reflection portion of the light source unit and the heat radiation plate are fixed by screwing in the state in which the light source unit is inserted in the accommodation section.

4. The illumination unit according to claim 2, wherein the heat radiation member of the light source unit is fixed to the frame by screwing in the state in which the light source unit is inserted in the accommodation section.

5. The illumination unit according to claim 1, wherein the accommodation section is configured such that the light source unit is attachable/detachable from an opening portion extending in the first direction of the accommodation section, and
    the reflection portion of the light source unit, which is mounted in the accommodation section, covers the opening portion of the accommodation section.

6. The illumination unit according to claim 5, wherein the reflection portion of the light source unit includes a projection portion which projects toward the accommodation section and extends in the first direction.

7. The illumination unit according to claim 5, wherein the heat radiation member includes an insertion portion on one end side thereof in the first direction, and the other end side thereof in the first direction is fixed to the frame by screwing in the state in which the light source unit is mounted in the accommodation section.

8. The illumination unit according to claim 5, wherein the reflection portion of the light source unit forms an armor of the illumination unit.

9. The illumination unit according to claim 1, wherein the adhesive tape has a width which is equal to or greater than a width of the film substrate.

10. The illumination unit according to claim 1, wherein the heat radiation member is formed of a metallic material.

11. The illumination unit according to claim 1, wherein the light emission surface of the light-emitting diode is spaced apart from the incidence surface of the light guide.

12. A liquid crystal display device comprising:
    a liquid crystal display panel which is configured to hold a liquid crystal layer between a pair of substrates; and
    an illumination unit which is disposed on the liquid crystal display panel and illuminates the liquid crystal display panel, the illumination unit including a light guide having an incidence surface; a frame which holds the light guide and is spaced apart from the incidence surface of the light guide; an accommodation section which is formed between the incidence surface of the light guide and the frame; and a light source unit including a plurality of light-emitting diodes each having a light emission surface which is substantially parallel to a mounting surface thereof, a film substrate on which the plurality of light-emitting diodes are arranged in a first direction and are mounted, a heat radiation member having a support portion which supports the film substrate and a reflection portion which extends from the support portion in a second direction perpendicular to the first direction, and an adhesive tape which adheres the film substrate to the support portion and has heat radiation properties, the light source unit being accommodated in the accommodation section and being configured such that the light emission surface of each of the light-emitting diodes faces the incidence surface of the light guide in a state in which the light source unit is accommodated in the accommodation section.

* * * * *